UNITED STATES PATENT OFFICE 2,464,231

METHOD FOR PREPARING PENTAMETHYL-ENE SILICONE POLYMERS

Joseph M. Hersh, Ponca City, Okla., assignor to Continental Oil Company, Ponca City, Okla., a corporation of Delaware No Drawing. Application June 18, 1945, Serial No. 600,239

3 Claims. (Cl. 260—448.2)

This invention relates as indicated to organo cyclo-silicon condensation products and relates not only to such products as new materials per se, but also to improved methods for the manufacture of such materials.

It is a further and more particular object of this invention to provide novel compositions of matter including the above identified products as an essential constituent.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The monomeric cyclo-silicon compounds to which the present invention relates have the following characterizing structures:

Formula 1

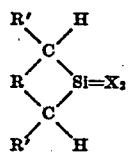

Formula 2

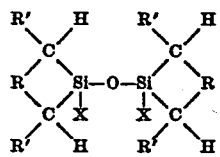

In their condensed form, these cyclo-silicones may be represented by the following empirical formulas:

Formula 3

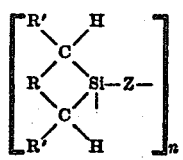

A representative formula for the dimeric condensed cyclo-silicones is as follows:

Formula 4

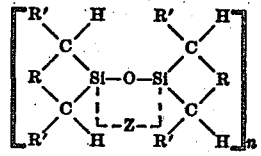

In Formulas 3 and 4 above, Z is an element of the group consisting of oxygen, sulfur, and nitrogen.

In Formulas 1 and 2 above, X represents a hydrolyzable and/or condensable radical such as any of the following:

Halogens

| Chlorine | Sulfhydryl |
| Iodine | Amino |
| Fluorine | Imino |
| Bromine | Oxide |
| Hydroxyl | Sulfide |

In each of the foregoing formulas, R' may be hydrogen or any organic radicle and R may be any organic radical such as the following representative organic radicals which will be found present in the preferred compounds of this invention.

(a) Alkyl radicals (normal or branched chain), e. g.:

| Propyl | Octyl |
| Amyl | The isomeric amyls |
| Isobutyl | The isomeric hexyls |
| Hexyl | The isomeric heptyls |

(b) Aryl radicals, e. g.:

| Phenyl | Naphthyl |
| Diphenyl | Anthracyl |

(c) Aralkyl radicals, e. g.:

| Phenyl-propyl | Phenyl-hexyl |
| Diphenyl butyl | Poly styryl |

A preferred class of this type of radical are those in which an aryl radical is substituted in an aliphatic carbon chain such as 1-3, 1-4 and preferably 1-5 diarylalkanes from which highly active di-halides may be formed.

(d) Alkaryl radicals, e. g.:

| Methyl-phenyl | Dodecyl-naphthyl |
| Propyl-phenyl | Wax-phenyl |
| Amyl-phenyl | Wax-diphenyl |
| Cetyl-phenyl | |

In certain cases, the aryl group may form, in part, the cyclo-silicon structure, such as when two silicon valences are to an aryl radical preferably in the 1-4 position.

(e) Cyclo non-benzenoid radicals, e. g.:

Cyclopentyl   Di-cyclohexyl
Cyclohexyl    Phenyl-cyclopentyl
Cyclobutyl    Wax-cyclohexyl
Methyl-cyclopentyl It will be observed that in certain cases the carbocyclic radical, in whole or in part, forms the cyclo-silicon structure.

(f) Heterocyclic radicals, e. g.:

Furyl       Phenyl-furyl
Pyridyl     Octadecyl-furyl
Thiophenyl

It will be observed that in certain instances, the cyclic radical, in part, permits of a dihalide derivative which is reactive to link silicon in a cyclo-silicon compound forming a bicyclic radical, including a heterocyclic silicon radical.

In each of the foregoing formulas, R' may be any of the radicals identified under R above, or alternatively, either or both of R' may be inorganic and selected from the following list which characterize the preferred compounds of my invention:

Hydrogen,
Halogen,
  Chlorine
  Iodine
  Bromine
  Fluorine
Nitrogen,
Phosphorus,
Sulfur, either simple or substituted.

In each of the Formulas 1 to 4 above, Si denotes a silicon atom.

In each of Formulas 1 to 4 above, $n$ is an integer equal to at least 2.

It will be observed that the unit structure of Formula 3 above is based upon the disilico-ether unit

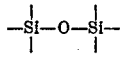

For a fuller understanding of the nature of my improved products and the novel methods by which the same may be prepared, reference may be had to the following examples:

EXAMPLE I.—SYNTHESIS OF CYCLO-SILICON HALIDES

These compounds having the following representative structure, viz:

*Formula 5*

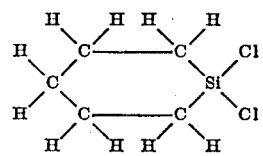

may be prepared by a procedure represented by the following:

Into a reaction vessel fitted with a reflux condenser, mechanical stirrer and reactant entry port, 2.5 molal parts of clean magnesium chips and 5 to 10 volumes of anhydrous ether (based upon the halide to be used) are stirred and warmed while one molal volume of 1,5-dibromopentane (102-103° C. B. P./15 mm. Hg) is added, at first undiluted and slowly; then, as the Grignard reaction proceeds, more rapidly and with anhydrous ether diluent until all the halide has been added. The reaction may require warming at the start or the addition of a reaction promoter such as a crystal of iodine or a drop or two of an active alkyl iodide such as ethyl iodide. When the reaction has started, the reactor should be strongly cooled to maintain only a slight, regular reflux of ether. Cooling is then gradually withdrawn and heating reinstituted to maintain an even ether reflux for three hours. The Grignard compound separates as an oily bottom layer. Then with rapid stirring and sharp cooling, such as with an ice-brine bath around the reactor, one molal part of silicon tetrachloride in ether solution is added slowly. Finely divided insoluble magnesium salts separate from the solution and the reaction is essentially complete when the silicon halide has been added and well stirred. The organo-silicon product is essentially cyclo-pentamethylene silicon dichloride. However, some monochloride and some trichloride are present. For many purposes the mixed cyclo-silicon halides, essentially the dichloride, may be hydrolyzed directly. I prefer to separate an essentially pure cyclo-silicon dihalide, in this case, in order to prepare a preferred primary cyclo-silicone by hydrolysis.

The reaction product is transferred under as near anhydrous conditions as possible to a distillation vessel, decanting the liquid from the separated solids. The solids are washed with anhydrous ether which is added to the product. By distillation at atmospheric pressure the ether is removed; then the product is fractionated to remove essentially pure cyclo-pentamethylene silicon dichloride, a clear liquid boiling at 165-175° C. at atmospheric pressure or at lower temperatures under reduced pressure. Fractionation is preferably at reduced pressure.

Instead of using 1,5-dibromopentane in the preparation of the cyclo-silicon compound, any reactive dihalide may be used such as 1,3-dibromopropane, 1,4-dichloro-2-phenylbutane, 1,4-dichloro-2,3-dimethylbutane, 1,5-dibromo-2-methylpentane, 1,5-dichloropentane, 1,6-diiodohexane, 1,4-dibromo-2-methylbutane, p-chlorobenzyl chloride, p-dibromobenzene, m-bromo phenethyl chloride, m-di-iodotoluene, 1-chloro-4-bromobenzene, 1,4-dichloronaphthalene, etc. or any of the halogenated R or R' organic radicals as shown above.

The preferred halide reactant should be in a carbon chain of at least three carbon atoms and preferably five carbon atoms such that the cyclo-silicon structure formed has a maximum stability inherent in forming and being part of a 4 to 6 or more membered ring.

EXAMPLE II.—HYDROLYZED CYCLO-SILICON HALIDES

When the cyclo-silicon halides as per Example I above are hydrolyzed in accordance with the improved process of my invention, a product having the following representative structure is produced:

*Formula 6*

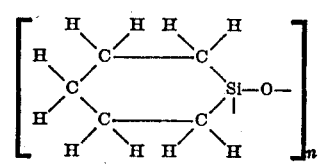

where $n$ is not more than 5. The product is a low molecular weight mobile liquid and not a high molecular weight hard resin such as has been heretofore described as the sole product of hydrolysis of the cyclo-silicon dihalide.

These products may be identified for convenience as primary cyclo-silicones. A representative manner in which these primary cyclo-silicones may be prepared in accordance with my invention is as follows:

The cyclopentamethylene silicon dichloride from Example I is dissolved in from 2 to 3 volumes of a low boiling inert solvent such as benzene and gradually added to a well stirred bath of ice-water or ice-brine with careful control so that hydrolysis is effected with a minimum of condensation. The product is extracted with benzene (the solvent used above) and concentrated in the benzene solution or recovered from the benzene by distilling off the solvent. The removal of benzene by vacuum distillation effects both a cooling of the reactants and a more complete controlled hydrolysis by the concommitant removal of volatile hydrogen halides.

EXAMPLE III.—CONDENSED PRIMARY CYCLO-SILICONES

The primary cyclo-silicones prepared by the improved hydrolysis method of my invention, as represented by Example II above, may be condensed to form products having a structure like that given in Formula 6 above excepting that $n$ in this case is from 5 to 50. A representative and preferred procedure in the preparation of such products which may be referred to for convenience as the intermediate polymer of the cyclo-silicone, having a molecular weight of from 600 to 6000, is as follows:

The primary cyclopentamethylene silicones from Example II, preferably diluted with an equal volume of a non-condensable hydrocarbon solvent such as a straight run paraffinic naphtha is treated with one volume of concentrated sulfuric acid and warmed gently with stirring until an apparently uniform solution is obtained. The reaction mixture is allowed to remain in contact for a requisite time to obtain the desired degree of condensation. For a lower molecular weight polymer where $n$ is from 5 to 50 about one-half hour of contact is sufficient. The product is then diluted with water to release the condensing agent, washed with dilute caustic solution when an acidic condensing agent has been used, separated and dried.

The oily product produced by the procedure just described may be separated from the hydrocarbon solvent but in most cases it will be found preferable to utilize the hydrocarbon solution of the cyclo-silicone for the purposes hereinafter more specifically explained for which these end products have been found to be particularly useful.

In the procedure outlined above, concentrated sulfuric acid has been referred to as the condensing agent. The strength of the condensing agent may be varied with the activity of the condensing agent and the ease of effecting condensation. With the lower molecular weight cyclo-silicon dihalides or the related primary silicones, condensation takes place quite readily so that a more dilute condensing agent and a shorter period of time may be employed for the controlled polymers. With higher molecular weight cyclo-silicones, halides, or ether halides the condensation is more readily controlled and the use of concentrated agents is preferred. Heat alone may be used to effect the condensation, but the avoidance of thermal dissociation, the greater homogeneity of the condensed product and the more accurate control of condensation by chemical condensing agents makes this the preferred means for carrying out the desired reaction. It will generally be found preferable to employ a chemical condensing agent such as the following:

$H_2SO_4$, $HSO_3Cl$, $HSO_3F$
$H_3PO_4$, $H_4P_2O_7$, $HPO_3$
$P_2O_5$, $P_2S_5$, $PCl_3$, $PCl_5$
$ZnCl_2$, $CoCl_2$, $MnCl_2$
$FeCl_3$, $AlCl_3$, $AlBr_3$
$HF$, $BF_3$
$HI$ etc., and for conciseness these are hereinafter referred to as "acid-acting chemical condensing agents."

The length of time during which the primary cyclo-silicones are exposed to the condensing action of any of the chemical agents listed above will determine the degree of condensation which takes place. Thus by controlling the degree of condensation of a condensable cyclo-silicone, as readily measured by molecular weight or viscosity change, I produce a selected compound having an optimum polymeric structure for a specific use. Upon attaining the desired degree of condensation, the condensable mass is freed of the condensing agent (by water washing if it is a chemical agent) and inhibited from further undesirable condensation by storage at low temperature and in solution in a non-condensing hydrocarbon medium, or preferably by the action of condensation inhibitors which are of the class of organic compounds miscible with the condensed silicone or thiosilicone having a labile group such as the alcohols, esters, amines, phenols or aminophenols. Ethyl alcohol, isopropyl amine, certain ethanol amines, ethyl silicate, ethyl borate, phenol p. aminophenol. N-tert butyl p-aminophenol, phenyl silicate, ethyl acetate and the like are effective in this function to a desirable degree. The condensation inhibiting agent is generally present in a ratio of from 1 to about 10 per cent of the condensed silicone. Prior to using the stabilized condensed silicone, the inhibiting agent may be removed, for example, by extraction with water, acetone, caustic or dilute acid solution depending upon the nature of the agent present. For many purposes, however, the ester of alcohol though generally not the amine inhibitors may act in a cooperating function with the cyclo-silicone, such that its removal from the condensed silicone need not be undertaken and in fact may advantageously be avoided. Thus a small amount of ethyl alcohol or ethyl silicate, for example, may be tolerated in an oily system in which the condensed silicone is used to control frothing in the processing of an oily-organic mixture as disclosed in my copending application, Serial No. 564,705. Similarly, small amounts of the more liophilic condensation inhibitors may be tolerated in the lubricant composition incorporating condensed organo silicon compounds as disclosed in copending applications Serial Nos. 527,136, 527,137, 564,703 filed November 22, 1944, now abandoned, and 519,188. I have thus prepared stable, homogeneous and versatile cyclo-silicones of from 500 to 10,000 molecular weight.

EXAMPLE IV.—ALTERNATIVE METHOD OF SYNTHESIZING CYCLO-SILICON HALIDES

Instead of using the synthesis method of Example I above, I may prepare disilicon halides, which are highly effective in producing the disilico-organic compounds based upon the unit structure

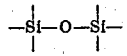

in which silicon atoms are linked through an intermediate linking element such as oxygen by using a material such as silicon oxychloride to produce halo-cyclo-silico-ethers from which condensed poly-dimensional polymers may be produced by controlled hydrolysis and condensation. An example of such procedure is as follows:

Silicon oxychloride (one molal part), magnesium (5 molal parts) and anhydrous ether are placed together in a reactor and 1,4 dichlorobutane is added in small quantities. Some time elapses before any noticeable change occurs and it may be necessary to warm gently or add a crystal of iodine to initiate the reaction; but when the reaction has once started, it normally proceeds vigorously with a considerable development of heat. The reactor is therefore strongly cooled to avoid boiling the ether, using an outside ice or ice-brine solution. The rest of the 1,4-dichloro-butane is then added slowly either directly or in ether solution (two molal parts of dichlorobutane) while the contents of the reactor are rapidly stirred. During this process, the magnesium is gradually changed to magnesium salts and the latter separate as a solid, heavy, coarsely crystalline powder. As soon as the whole of the butyl dichloride has been added, the etheral solution of the silicon compound may be separated by filtering and extracting in the usual way or by gradually heating the reactor and distilling off the ether and then the crude halide. The crude mixture of cyclo-silicon halides thus prepared may be used directly in the subsequent hydrolysis. The combined product may be hydrolyzed rapidly in ice water or in a hydrolyzing bath held substantially at 0° C. or lower and washed to remove residual HCl. The primary di-cyclo-silicol-ether thus prepared has two hydroxyl groups per molecule and may be further condensed on heating or by chemical agents to produce the preferred condensed di-cyclo-silicone. The primary di-cyclo-butyl silicol-ether is a practically colorless limpid liquid in a primary state of condensation. When the oily product is kept over concentrated sulfuric acid, it very gradually condenses giving off water to form more highly condensed cyclo-butyl silicone. By this gradual condensation method, the reaction can be stopped when the optimum degree of condensation has been effected, then by stabilizing the silicone solution, for example, by dissolving the silicone in an inert non-condensing hydrocarbon, or by adding an inhibitor of condensation as shown above. The preferred additive may be kept for a considerable period of time.

EXAMPLE V.—DIRECT PREPARATION OF POLYMERIC CYCLO-SILICONES

The direct preparation of a polymeric cyclo-silicone may be carried out very effectively using active metals such as magnesium, zinc, aluminum, sodium, lithium, potassium or alloys such as lithium-sodium, sodium-potassium, and the like to effect the coupling. It is highly desirable, for example to bring about the reaction as described above (Example IV) with metallic sodium (10 molal parts) in the form of molten dispersed sodium particles in a dry inert solvent medium such as toluene or xylene. Under these higher temperature conditions permissible with silicon oxyhalide, an organic dihalide, such as paradichlorobenzene, reacts instantaneously to produce the desired chloro dicyclophenyl-silicol ether, which may then be carefully hydrolyzed in the same reaction vessel with controlled cooling or warming to give the desired primary silicol-ether in a low state of polymerization for further condensation in the presence of condensing agents as shown above.

EXAMPLE VI.—PREPARATION OF CYCLO-SILICON ESTERS

A particularly effective and preferred means of converting and then condensing the halo-cyclo-silicon compounds is by the use of alcohols to effect an alcoholysis of the halogenated compounds as prepared in the above examples. For example, the chloro-dicyclobutyl-silico-ether of Example IV is treated under controlled conditions of cooling with an alcohol or a metal alcoholate such as sodium methylate and/or ethyl alcohol (3 molal parts) to effect the removal of halogen from silicon and replacing such halogen with an ester group "OR." This ester type of compound is not as readily hydrolyzed by atmospheric moisture or water as the halide and the cyclo-silicon compound is stabilized for protracted storage or handling. At the selected time the ester type compounds, where the ester group is from a simple alcohol such as methyl, ethyl, phenyl, and so forth, may then be treated with a condensing agent such as constant boiling hydriotic acid (127° C. boiling point) to produce a controlled condensate. On boiling the silicon compound with HI in inert solutions such as benzene for a modest period of time, from 15 minutes to an hour or longer, the degree of condensation can be controlled to produce the desired polymeric form. By this means certain active cyclo-silicon compounds, particularly the cyclo-silicones, have been prepared in optimum degree of activity, for example where $n$, the integer indicating the degree of molecular condensation as shown above in the formulas, is from 5 to 50 and preferably from 30 to 40, such that the condensed compound has a molecular weight approximately 4000. This compound has extremely active anti-foaming properties such that one part of the above material in from 100,000 to 1,000,000 parts or more of oil practically eliminates the foaming tendency of such oil. On further treating such halogen containing esterified or partially condensed silicon compound with a condensing agent such as $BF_3$, HI, $AlCl_3$, and the like, the more highly complex cyclo-silicones have been produced.

The various materials referred to above will be found to be preferable for use as compared with the silicones and halogenated silicones of the prior art as represented by U. S. Patents Nos. 2,258,218; 2,258,219; 2,258,220; 2,258,221; and 2,258,222, which relate to the preparation of resinous materials, either aliphatic or aromatic in which the silicone structure has no cyclo-silicon nucleus. For example, the methyl silicones disclosed in the above-identified patents are resinous materials having from 1 to 2 methyl groups per silicon atom and the ethyl silicones have from ½ to 1½ ethyl groups per silicon atom. These compounds are especially resinous in character as described in said patents. The compounds contemplated by the present invention are of a heterocyclic structure in which silicon is bound in an organo-carbon ring. This structure thus simulates an aryl-silicane of extremely high stability, but is different in that the silicon is part of the ring. Instead of having alkyl or aryl groups attached to silicon by a single valence bond, the system of compounds to which this invention relates has an organic chain linked to silicon by two valences. Thus molecular complexity is built up in the cycle-organo constituents of silicon to an extent not shown in the prior art. This characteristic of molecular complexity affects the physical and chemical properties of the compositions so prepared, especially their solubility in hydrocarbon type solvents and oils, their surface active effect in oil or hydrocarbon solutions such as influences their anti-frothing or anti-foaming properties, and especially their chemical stability. This series of compounds has these outstanding and other differences from the known organo-silicones of the art.

By the linking of a carbon chain of at least three carbon atoms to silicon by two valences in a cyclic structure of at least four unit members, the molecular structure is stabilized and made more complex through internal linkages. For example, in the dihydrocarbon silicols of the prior art, such as $R_2Si(OH)_2$, the presumed diol is very readily condensed to form a silicone structure in which a two-dimentional polymeric unit is produced, forming a resinous compound quite readily. In the system of compounds to which this invention relates, the added structural complexity of the silicon-carbon-silicon ring (or chain) gives a more stable and less condensable three-dimensional polymer providing a more versatile material in lower molecular weight. Similarly, in the $R_3Si—X$ compounds, where $X$ is halogen or hydroxyl which is condensable, the condensed material is a dimeric linear polymer. However, in the cyclic structure of this invention, the added cyclic complexity provides a two-dimensional polymer whereas the prior art non-cyclic silicol provides only a linear polymer.

Further, by the use of a silicon oxy-halide such as $Si_2OCl_6$ as the basic silicon reactant, it is possible to prepare a dimeric silico-ether containing a cyclo-silicon structure on each silicon atom and having then a residual halogen for hydrolysis and controlled condensation. In this type of compound there is provided a new composition of matter having particular utility in fields such as a light, oi'y liquid having particular anti-frothing action in chemical processes or as a viscous, oily liquid having particular use as an anti-foam agent in lubricating oil compositions, or as a more viscous product having higher molecular weight and improved viscosity improving characteristics.

Compounds of this structure may also be highly condensed to produce thermostable resins, plastics or films.

One of the particular advantages of my invention is in the method of manufacture. Thus, while methyl or ethyl silicon halides and silicones of the prior art must necessarily be prepared by means of the Grignard-type compounds using magnesium or zinc in anhydrous ether, the corresponding cyclo-silicon compounds of the present invention, especially when using silicon oxyhalide, can be prepared under higher temperature conditions and under the catalytic and coupling effect of the alkali metals by which means the halogen atoms of both the silicon reagent and the organic reagent are coupled and eliminated forming the organosilicon complex for further hydrolysis and condensation.

While methyl and ethyl halides have low boiling points such that a reaction involving these compounds requires pressure vessels and particular low temperature handling such as will normally preclude a rapid and favorable reaction rate, the alkyl dihalides or the aryldihalides of organic compounds having three or more carbon atoms in which the two halogen atoms are separated by at least three carbon atoms employed herein are high boiling, safe liquids which are active with silicon halides and do not require low temperature handling or pressure vessels in bringing about the reactions involved. Thus dihalides used in the present invention may be coupled with the silicon reagent by means of the active coupling metals such as lithium, sodium, potassium and potassium-sodium alloy, and the like, in inert solvents such as benzene, toluene xylene, and the like, at elevated temperatures under which conditions the active metals are molten and finely dispersed and, therefore, in a most active state. By this means the cyclo-silicon compounds are advantageously formed at a relatively low cost.

The compounds produced in accordance with my invention have a wide variety of uses. The lower polymeric forms are particularly useful for purposes such as:

(a) anti-foam agent in blended heavy duty oils in concentrations of from .00001 per cent to 0.1 per cent, which concentration effectively eliminates foaming in such lubricants under conditions of mechanical agitation.

(b) anti-frothing agents in oily-organic processing systems in concentrations of from 0.0001 per cent to 0.1 per cent, which concentrations are effective in eliminating or controlling frothing in various oily-organic processing systems such as the vacuum distillation of lube oil stocks, dehydration of oils, soap formation in the neutralization of fatty acids and organic acids, rendering of fats and the like, dehydration and deaeration of greases, halogenation, hydrogenation, dehalogenation and dehydrogenation of oils, fats, and waxes, etc.

In certain lubricating compositions concentrations of the condensed cyclo-silicones of from 0.1 per cent to 10 per cent or more may be used as viscosity improving agents and stabilizing agents. In this range of concentrations, I have found that the halogen-bearing or halogenated silicones have excellent extreme pressure and load carrying properties such that a composition containing 0.1 per cent or more of the halogen bearing silicones show high Timken load test. The cyclo-silicon compounds are particularly effective in this regard when the halogen (preferably chlorine) atom or atoms are attached to carbon atoms in the alpha or primal position relative to the silicone atom. For example in the generic formula of the cyclo-silicones

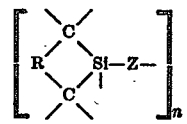

the halogenated species have the highest order of effectiveness as extreme pressure agents when the groups designated as "C" above are halogen substituted. The secondary position for halogen substitution, but still of outstanding importance is on a carbon atom beta to the silicon atom, whether this be in the cyclo-silicon ring or on a side chain such as an R' group attached to "C." The halogen atoms so substituted have a controlled activity which apparently gives them the degree of instability suited to overcoming metal seizure under the conditions of boundary lubrication.

When additional quantities of halogens are introduced in the cyclo-silicon structure, these polyhalogenated silicones form an extremely viscous, tough thermotropic composition having high resistance to ignition and to attack by insects or fungi. These compositions serve as excellent fire-proofing, fungus and insect-proofing components of impregnating or coating baths for fabrics, ropes, organic plastics, wood and other susceptible construction materials.

The higher polymeric forms of the compounds of my invention are useful for a wide variety of purposes such as for electrical insulation, coating, impregnating, etc.

The organo cyclo-silicon condensation products of the present invention, and particularly those in which $n$ is from 5 to 50, are especially adapted for use in lubricating compositions comprising a mineral lubricating oil to which there has been added a material which has the property of increasing the foaming tendencies of the oil. The materials of the present invention will be found particularly useful when combined with products, such as those disclosed in U. S. Patents Nos. 2,139,766; 2,197,833, 2,197,834; 2,197,835; 2,228,661; and 2,228,671, the materials of such patents being generically classifiable as phenates and are customarily employed in lubricating compositions for the purpose of increasing the detergency of the oil. Another class of detergents with which the compounds of the present invention may be advantageously employed in combination are the sulphonates, that is, the metallic salts of sulphonic acids and particularly the oil-soluble metallic salts of petroleum sulphonic acids.

For an additional list of usages to which the compounds of the present application are particularly applicable, reference may be had to the copending applications Serial No. 564,705, filed November 22, 1944; Serial No. 538,204, filed May 31, 1944, now forfeited, Serial No. 564,703, filed November 22, 1944, now abandoned; Serial No. 519,188, filed January 21, 1944; Serial No. 527,137, filed March 18, 1944; Serial No. 527,136, filed March 18, 1944; in each of which applications I am either a sole or joint inventor.

Other modes of applying the principle of the invention may be employed, change being made as regards the details described, provided the features stated in any of the following claims or the equivalent of such be employed.

I, therefore, particularly point out and distinctly claim as my invention:

1. The method of producing an oily polymer of the following structure:

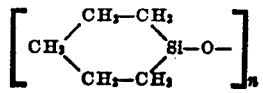

where $n$ is from 5 to 50 which comprises hydrolyzing a cyclo-silicon halide in an ice bath to produce a primary cyclo-silicone having the above structure but in which $n$ is not more than 5, recovering such primary cyclo-silicone and dissolving it in an inert solvent, and contacting such solution for a period of about one-half hour with an acid-acting chemical condensing agent.

2. The method of producing an oily polymer of the following structure:

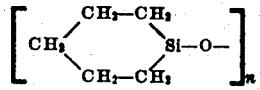

where $n$ is from 5 to 50 which comprises hydrolyzing a cyclo-silicon halide in an ice bath to produce a primary cyclo-silicone having the above structure but in which $n$ is not more than 5, recovering such primary cyclo-silicone and dissolving it in an inert solvent, and contacting such solution for a period of about one-half hour with a mineral acid condensing agent.

3. The method of producing an oily polymer of the following structure:

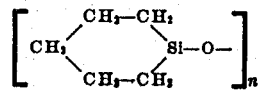

where $n$ is from 5 to 50 which comprises hydrolyzing a cyclo-silicon halide in an ice bath to produce a primary cyclo-silicone having the above structure but in which $n$ is not more than 5, diluting such primary cyclo-silicone in a non-condensable hydrocarbon solvent, and contacting such solution for a period of about one-half hour with an acid-acting chemical condensing agent to produce said oily polymer dispersed in an inert solvent.

JOSEPH M. HERSH.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,352,974 | Rochow | July 4, 1944 |
| 2,371,050 | Hyde | Mar. 6, 1945 |
| 2,371,068 | Rochow | Mar. 6, 1945 |
| 2,381,002 | Patnode | Aug. 7, 1945 |

OTHER REFERENCES

Hart, "Jahresbericht uber die Fortschitte der Chemie," 1889, pages 1943–1945.

Bygden, "Berichte Deut. Chem. Gesell.," vol. 48, pages 1236–1242 (1915).

Hyde, "Jour. Am. Chem. Soc.," vol. 63, pages 1194–1196.